United States Patent [19]
Sakamoto

[11] Patent Number: 5,600,117
[45] Date of Patent: Feb. 4, 1997

[54] MARK SHEET READING APPARATUS

[75] Inventor: Hisaharu Sakamoto, Tokyo, Japan

[73] Assignee: NEC Corporation, Tokyo, Japan

[21] Appl. No.: 364,267

[22] Filed: Dec. 27, 1994

[30] Foreign Application Priority Data

Dec. 28, 1993 [JP] Japan .................................. 5-334551

[51] Int. Cl.$^6$ ....................................................... G06K 7/10
[52] U.S. Cl. ........................... 235/456; 235/454; 235/470
[58] Field of Search ..................................... 235/456, 454, 235/470

[56] References Cited

U.S. PATENT DOCUMENTS

| | | | |
|---|---|---|---|
| 3,852,573 | 12/1974 | Dolch | 235/456 |
| 4,153,895 | 5/1979 | Weishbrod et al. | 235/456 |
| 4,774,400 | 9/1988 | Kimura | 235/470 |
| 4,937,439 | 6/1990 | Wanninger | 235/456 |
| 5,004,896 | 4/1991 | Serrell et al. | 235/456 |
| 5,093,653 | 3/1992 | Ikehira | 340/727 |
| 5,101,447 | 3/1992 | Sokoloff | 235/456 |
| 5,229,589 | 7/1993 | Schneider | 235/456 |
| 5,245,166 | 9/1993 | Shepard | 235/456 |
| 5,416,308 | 5/1995 | Hood et al. | 235/456 |

FOREIGN PATENT DOCUMENTS 3-15970   1/1991   Japan .

*Primary Examiner*—Harold Pitts
*Attorney, Agent, or Firm*—Sughrue, Mion, Zinn, Macpeak & Seas

[57] ABSTRACT

A mark sheet reading apparatus is disclosed which can correct the coordinates of a binary signal read from a mark sheet when the mark sheet is in skew with an angle. A mark sheet having a plurality of marking areas arranged in a matrix of rows and columns thereon additionally has a reference row mark in the form of a continuous straight line provided in parallel to a row of the matrix and extending over a length covering the overall length of the row. The mark sheet reading apparatus comprises a reference row mark detection section for discriminating a successive condition of dots from among data read by an image sensor to detect the reference row mark of the mark sheet, a skew detection section for detecting an inclination rate of the reference row mark thus detected, and a skew correction section for correcting coordinates of binary data read by the image sensor in accordance with the inclination rate of the thus detected reference row mark.

2 Claims, 8 Drawing Sheets

MARK SHEET READING APPARATUS

BACKGROUND OF THE INVENTION

1. Field of the Invention

This invention relates to a mark sheet reading apparatus, and more particularly to a mark sheet reading apparatus for reading marks from a mark sheet on which marking areas, which are binary digitized by marking or painting out them or leaving them blank, are provided in rows and columns of a matrix together with timing marks provided for the individual columns or rows. More specifically, the present invention relates to improvements in means of a mark sheet reading apparatus for correcting coordinates of read data when a mark sheet is read or transported in skew.

2. Description of the Related Art

In conventional mark sheet reading apparatus of the type mentioned, the skew of a mark sheet is usually corrected by physically correcting the position of the mark sheet itself by means of a transporting mechanism section.

However, such physical skew correction means is disadvantageous in that, since the transport mechanism section is complicated in structure, the entire mark sheet reading apparatus is increased in size and in cost.

Meanwhile, Japanese Patent Laid-Open Application No. Helsei 3-15970 discloses a different skew correction means which corrects skew by image processing of data obtained by reading a mark sheet. The processing method is schematically illustrated in FIG. 9. Referring to FIG. 9, where the transporting direction of a mark sheet 50 is represented as the x-axis direction and a direction perpendicular to the x-axis direction is represented as the y-axis direction, an image sensor 51 of the line type on which optic elements are arranged in a row is disposed in parallel to the x-axis. A plurality of marking areas in the form of printed rectangular frames are disposed in rows and columns of a matrix on the mark sheet 50 and selectively marked or painted up into marked marking areas 52 while the other marking areas remain unmarked or blank marking areas 53. Further, a series of timing marks 54 each in the form of a marked or painted up printed rectangular frames are provided along a side edge of the mark sheet 50 in register with and indicative of the individual rows of the marking areas in the matrix. In addition, a pair of left and right skew detection marks 55 and 56 each in the form of a marked or painted up printed rectangular frame are provided in a spaced relationship by a fixed distance W from each other at locations forward of the first row of the matrix of the marking areas on the mark sheet 50. The skew detection marks 55 and 56 are positioned on a straight line parallel to the rows of the marking areas of the matrix.

It is assumed now that the mark sheet 50 is positioned in skew with a certain angle α with respect to the image sensor 51 in FIG. 9. In this instance, the image sensor 51 first reads binary data represented as marks or blanks in all of the marking areas on the mark sheet 50. Then, the two skew detection marks 55 and 56 are detected from the picture element data obtained from the image sensor 51, and the difference in position between the skew detection marks 55 and 56 in the y-axis direction is discriminated. The difference thus discriminated is converted into a number of rows to obtain a skew row number T, and the trigonometric ratio T/W between the skew row number T and the distance W between the two skew detection marks 55 and 56 is calculated and determined as the skew inclination α of the mark sheet 50. Then, upon correction of the coordinates of each of the marked marking areas 52 and the blank marking areas 53, a row preceding the row to which the marked marking area 52 or blank marking area 53 in question belongs is referred to. The reference row here is determined in the following manner.

In particular, where the skew row number is represented by T, when the mark sheet 50 is in skew with a right portion thereof displaced upwardly and picture element data of a certain row are read by the image sensor 51, a row preceding by the distance of T/W×n rows to the certain row is referred to for a picture element at the distance n rightwardly from the left end one of the picture elements, that is, for a marked marking area 52 or a blank marking area 53 corresponding to the picture element. On the other hand, when the mark sheet 50 is in skew with a left portion thereof displaced upwardly and picture element data of a certain row are read by the image sensor 51, a row preceding by the distance of T/W×n rows to the certain row is referred to for a picture element at the distance n leftwardly from the right end one of the picture elements. Here, where the distance to the reference in terms of a number of rows is represented by s, the conventional skew correction means described above presupposes that the trigonometric ratio s/n between s and n is equal to the trigonometric ratio T/W between T and W calculated from the two skew detection marks 55 and 56 which are provided in a spaced relationship from each other.

However, while the distance W between the two skew detection marks 55 and 56 is determined in advance and fixed, the skew row number T is calculated from a difference in the y-axis direction between the positions of the two skew detection marks 55 and 56 detected from within the read data of the image sensor 51. Accordingly, the trigonometric ratio T/W between the distance W and the skew row number T does not accurately indicate the actual inclination of the mark sheet 50. Further, since the relationship s/n=T/W stands only when the inclination α of the skew of the mark sheet 50 is comparatively small but does not stand when the inclination α is comparatively great, where the inclination of the skew of the mark sheet 50 is great, the coordinates of the marked marking areas 52 and the blank marking areas 53 are detected in error, and consequently, the skew of the mark sheet 50 cannot be corrected accurately.

SUMMARY OF THE INVENTION

It is an object of the present invention to provide a mark sheet reading apparatus which can correct the coordinates of a binary signal read from a mark sheet when the mark sheet is in skew with an angle.

In order to attain the object described above, according to the present invention, there is provided a mark sheet reading apparatus for reading a mark sheet, which comprises a transporting apparatus for transporting a mark sheet, which has a plurality of marking areas arranged in a matrix of rows and columns thereon, in a direction along a column of the matrix, the marking areas of the mark sheet being selectively marked or left unmarked so as to represent binary data, the marks in the marking areas including timing marks arranged in a column corresponding to the individual rows of the matrix, an image sensor for reading the mark sheet, the mark sheet further having a reference row mark in the form of a continuous straight line provided in parallel to the rows of the matrix and extending over a length covering the overall length of the rows, and a mark detection processing section for detecting and discriminating a binary mark from within data read by the image sensor, the mark detection processing section including reference row mark detection means for discriminating a successive condition of dots from among the data read by the image sensor to detect the reference row mark of the mark sheet, skew detection means for detecting an inclination rate of the reference row mark detected by the reference row mark detection means, and skew correction means for correcting coordinates of binary data read by the image sensor in accordance with the inclination rate of the reference row mark detected by the skew detection means.

When a two-dimensional coordinate system is applied to read data of the image sensor, the inclination rate of the reference row mark is represented as a trigonometric ratio of a right-angled triangle whose oblique line is provided by the reference row mark, or in other words, as a ratio between a substantial length D of the reference row mark and a length L of an x-axis component of the reference row mark. Of the two lengths, the length L of the x-axis component of the reference row mark can be calculated from the difference $X_2 - X_1$ between the coordinate $X_1$ of one end of the reference row mark on the x-axis and the coordinate $X_2$ of the other end of the reference row mark on the x-axis, that is, the number of picture elements included between the coordinates of the two points on the x-axis. Further, the substantial length D of the reference row mark can be detected by the following two methods.

According to the first method, where the image sensor is of the line type, if the scanning direction of picture elements of the image sensor is represented as x-axis direction and the transporting direction by the transporting apparatus is represented as y-axis direction, then the substantial length D of the reference row mark is calculated from the length L of the x-axis component of the reference row mark detected as described above, a difference T between detection times of the opposite ends of the reference row mark in the y-axis direction and a transporting speed V of the transporting apparatus in accordance with the following equation (1):

$$D = \sqrt{L^2 + (V \cdot T)^2} \quad (1)$$

According to the second method, data read by the image sensor are first stored as two-dimensional data in the x-axis direction and the y-axis direction into a memory, and then the substantial length D of the reference row mark is calculated from the coordinates $(X_1, Y_1)$ and $(X_2, Y_2)$ of the opposite ends of the reference row mark of the-two-dimensional data in accordance with the following equation (2):

$$D = \sqrt{(X_2 + X_1)^2 + (Y_2 - Y_1)^2} \quad (2)$$

In correction of the coordinates $(X_n, Y_n)$ of a marked marking area on an nth row, where the distance between the timing mark on the row and the marked marking area in the x-axis direction is represented by $L_n$ and the substantial distance along the row is represented by $D_n$, the distances $L_n$ and $D_n$, the substantial distance D of the reference line mark and the length L of the x-axis component of the reference line mark satisfy the relationship given by the following equation (3):

$$D_n : L_n = D : L \quad (3)$$

The distance $L_n$ of the x-axis component can be calculated from the number of picture elements of the x-axis component between the timing mark and the marked marking area. Meanwhile, the substantial distance $D_n$ along the row can be calculated in accordance with the following equation (4):

$$D_n = L_n \cdot (D/L) \quad (4)$$

Thus, it can be discriminated from the ratio $D_n/P_M$ between the distance $D_n$ thus calculated and a predetermined marking area pitch $P_M$ (distance between adjacent marking areas on a same row) what numbered marking area on the nth row the marked marking area is. It is to be noted that what numbered row the current row is can be discriminated by detecting the timing marks.

As described above, with the mark sheet reading apparatus of the present invention, mark sheet, on which a plurality of marking areas to be selectively marked or left blank so as to represent binary data are provided in rows and columns of a matrix, has a reference row mark in the form of a continuous line provided thereon such that it extends over a length covering the overall length of a row of the matrix. The reference row mark is detected and the inclination rate of the reference row mark, that is, the ratio between the substantial length D of the reference row mark and the length L of the x-axis component of the reference row mark, is calculated, and the coordinates of binary data read from the marking areas are corrected in accordance with the ratio thus calculated. Consequently, the coordinates of the binary data can be corrected accurately.

The above and other objects, features and advantages of the present invention will become apparent from the following description and the appended claims, taken in conjunction with the accompanying drawings in which like parts or elements are denoted by like reference characters.

DETAILED DESCRIPTION OF THE PREFERRED EMBODIMENTS

Figure 1:
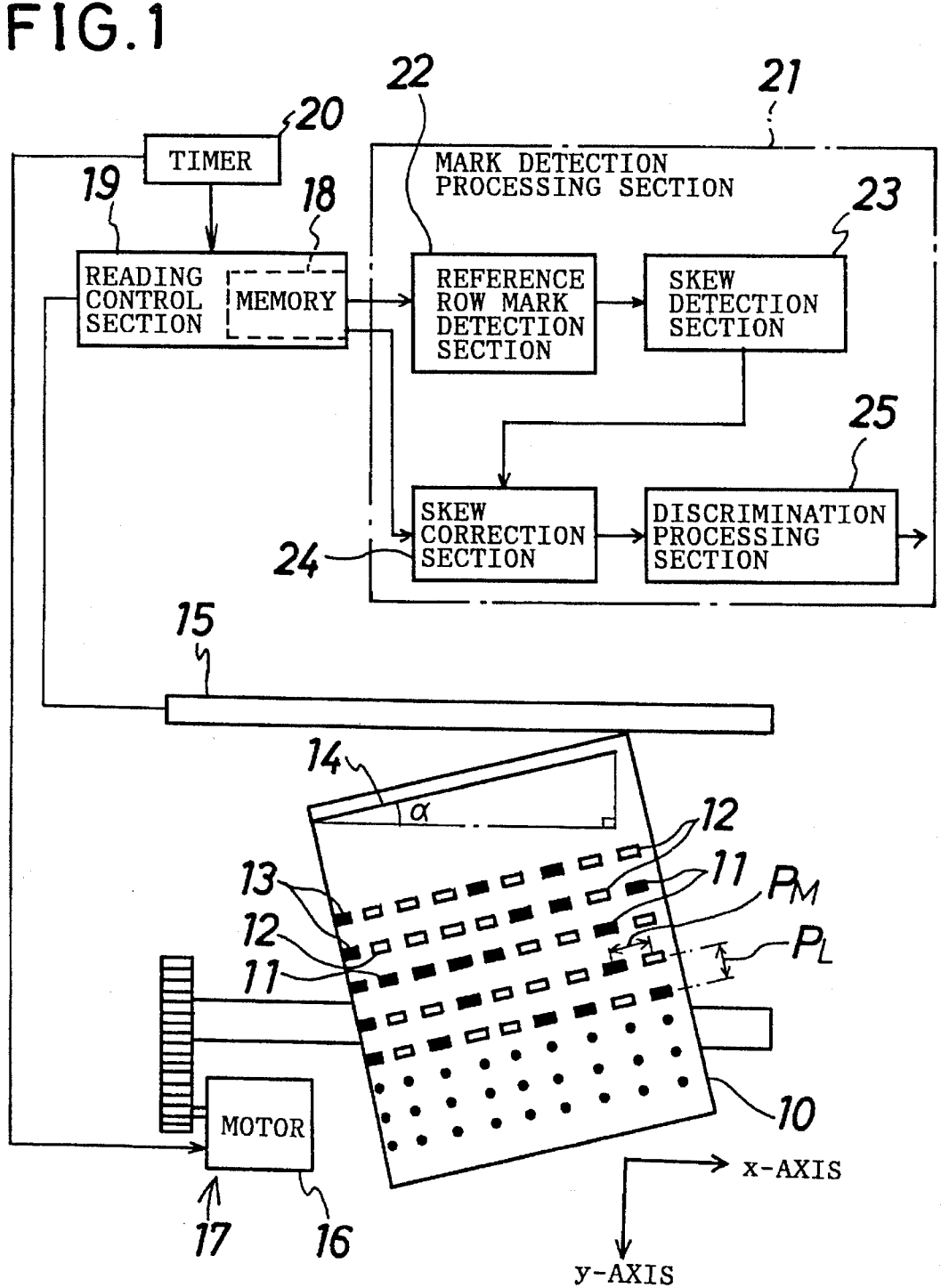
FIG. 1 is a block diagram of a mark sheet reading apparatus showing a first preferred embodiment of the present invention together with a mark sheet.
Figure 9:
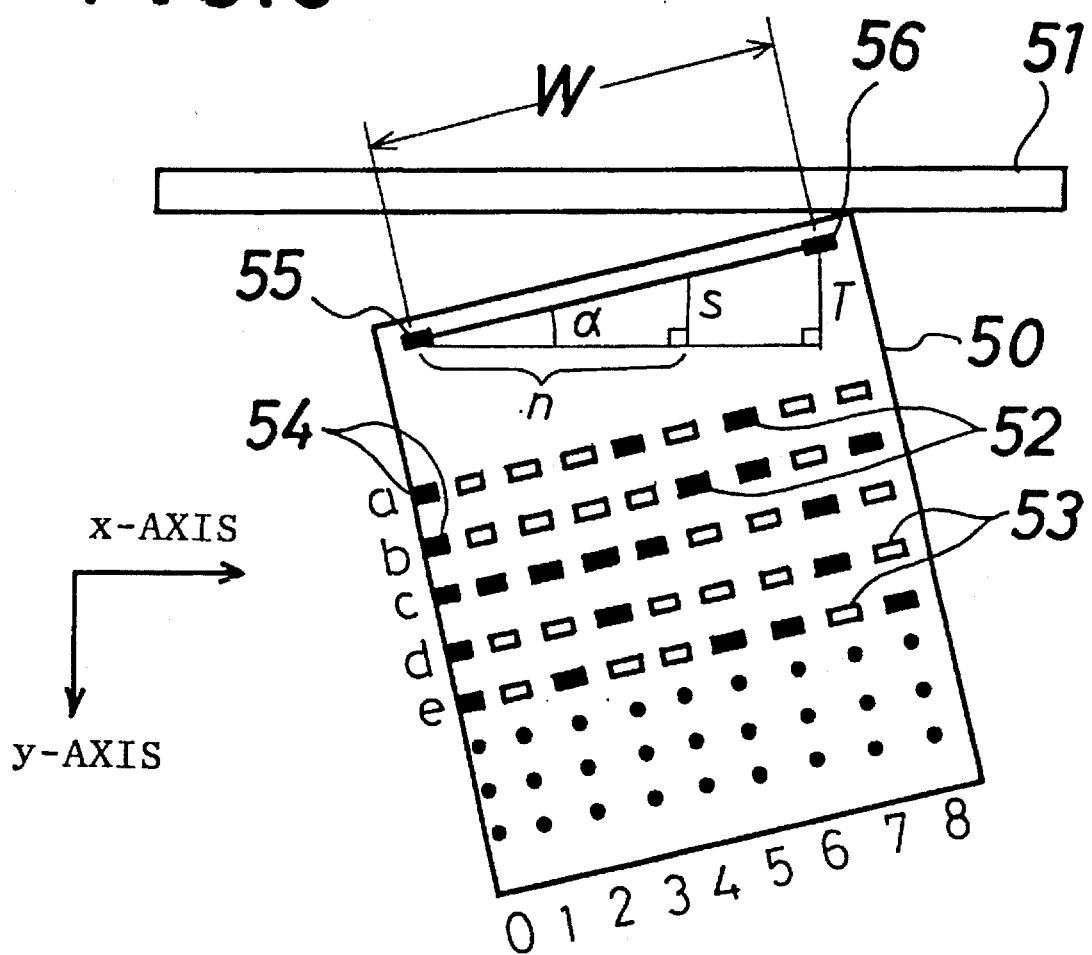
FIG. 9 is a schematic view illustrating a skew correction method by a conventional mark sheet reading apparatus.

Referring first to FIG. 1, there is shown a mark sheet reading apparatus according to a first preferred embodiment of the present invention together with a mark sheet. The mark sheet 10 has, similarly to the conventional mark sheet 50 described hereinabove in connection with FIG. 9, a plurality of marking areas in the form of printed rectangular frames disposed in rows of columns of a matrix thereon and selectively marked or painted up into marked marking areas 11 while the other marking areas remain unmarked or blank marking areas 12 so as to represent binary data. Further, a series of timing marks 13 each in the form of a marked or painted up printed rectangular frame are provided along a side edge of the mark sheet 10 in register with and indicative of the individual rows of the marking areas in the matrix. The marking area pitch $P_M$ between each two adjacent marking areas on each row is fixed, and also the row pitch $P_L$ between each two adjacent rows is fixed. While the timing marks 13 are shown provided on the left side edge of the mark sheet 10 in FIG. 10, such timing marks may be provided alternatively on the right side edge or on both of the left and right side edges of the mark sheet 10.

However, the mark sheet 10 described above additionally has a single reference row mark 14 in the form of a straight line at a position thereof forward of the marking area arrangement zone in which the marked marking areas 11 and the blank marking areas 12 are arranged in a matrix. In particular, the reference row mark 14 is a continuously marked or painted up straight line extending from the left edge of the mark sheet 10 over the overall length of and parallel to the rows of the matrix of the marking areas.

The mark sheet reading apparatus for reading such a mark sheet 10 as described above includes an image sensor 15 of the line type sufficiently longer than the width or horizontal dimension of the mark sheet 10, a transporting mechanism 17 including a motor 16 for transporting the mark sheet 10 in a direction perpendicular to the image sensor 15, a reading control section 19 for controlling the reading operation of the image sensor 15 and storing read data of the image sensor 15 into a memory 18, a timer 20 for controlling the motor 16 so that the transporting speed of the transporting mechanism 17 may be fixed and for measuring a time required for detection of the reference row mark 14, and a mark detection processing section 21 for detecting and discriminating marks from among data stored in the memory 18.

The mark detection processing section 21 includes a reference row mark detection section 22 for discriminating a successive condition of dots or marks from among data stored in the memory 18 to detect the reference row mark 14, a skew detection section 23 for detecting the inclination rate of the reference row mark 14 detected by the reference row mark detection section 22, a skew correction section 24 for correcting the coordinates of the marked marking areas 11 in the data stored in the memory 18 in accordance with the inclination rate of the reference row mark 14 detected by the skew detection section 23, and a discrimination processing section 25 for performing predetermined discrimination processing for the thus corrected data of the marked marking areas 11.

Figure 2:
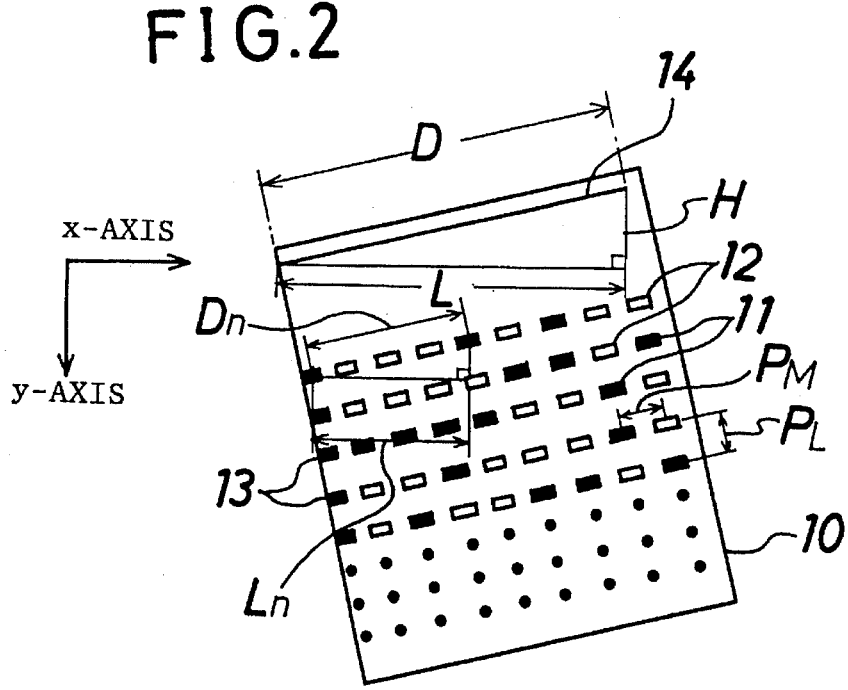
FIG. 2 is a schematic plan view showing the mark sheet in skew with a right portion thereof displaced upwardly.
Figure 3:
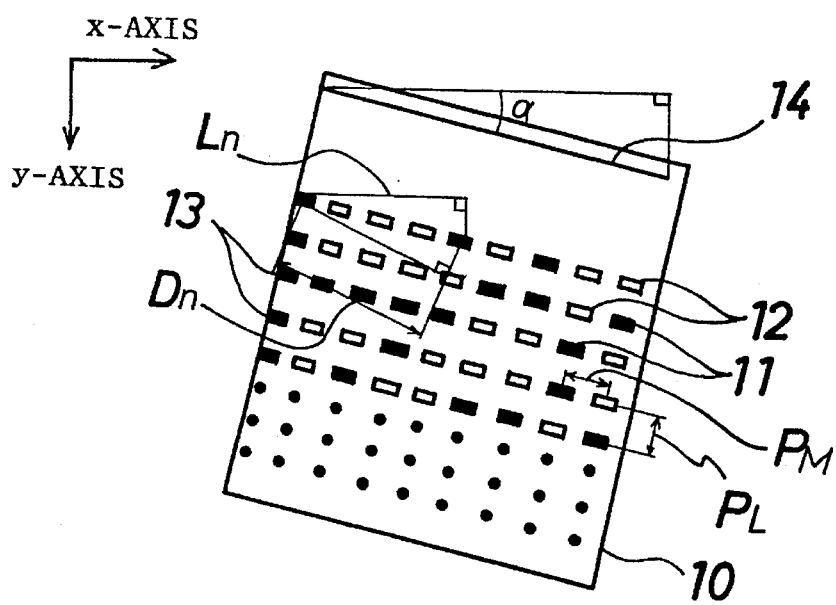
FIG. 3 is a similar view but showing the mark sheet in skew conversely with a left portion thereof displaced upwardly.

Now, supposing a two-dimensional coordinate system wherein the scanning direction of picture elements of the image sensor 15 is taken as an x-axis direction and the transporting direction of a mark sheet by the transporting mechanism 17 is taken as a y-axis direction, if it is assumed that the mark sheet 10 is in skew with an angle α with a right portion thereof displaced upwardly as shown in FIG. 2 or with a left portion thereof displaced upwardly as shown in FIG. 3, then also the reference row mark 14 is inclined by the same angle α with respect to the x-axis. Here, if a right-angled triangle with the oblique line thereof defined by the reference row mark 14 is supposed, then where the length of the oblique line of the right-angled triangle (substantial length of the reference row mark 14) is represented by D; the length of the horizontal line of the right-angled triangle parallel to the x-axis (length of the x-axis component of the reference row mark 14) is represented by L; and the length of the vertical line of the right-angled triangle parallel to the y-axis (length of the y-axis component of the reference row mark 14) is represented by H, the angle α can be calculated from the trigonometric ratio between L and H if L and H are given. Further, D can be calculated from the following equation:

$$D = \sqrt{L^2 + H^2} \qquad (5)$$

Thus, the mark sheet reading apparatus of FIG. 1 first detects the reference row mark 14 from among the data read by the image sensor 15 and stored in the memory 18, and calculates L from the x-axis coordinates of the opposite ends of the reference row mark 14 and calculates H from the difference T in detection time of the opposite ends of the reference row mark 14 in the y-axis direction and the transporting speed V of the transporting mechanism 17. The processing of the mark sheet reading apparatus just described will be described in more detail below with reference to the flow chart of FIG. 4. Here, the number of dots or marks of the read data of the image sensor 15 is represented by n; the maximum value of the number of dots is represented by $n_{MAX}$; the variable representing the x-axis coordinate of a particular one dot is represented by $x_n$ and the variable representing the y-axis coordinate of the particular one dot is represented by $y_n$; the variable representing the count value of the timer 20 shown in FIG. 1 is represented by t; and the dot detection flag is represented by FL. It is to be noted that the timer 20 continuously operates to count up.

Figure 4:
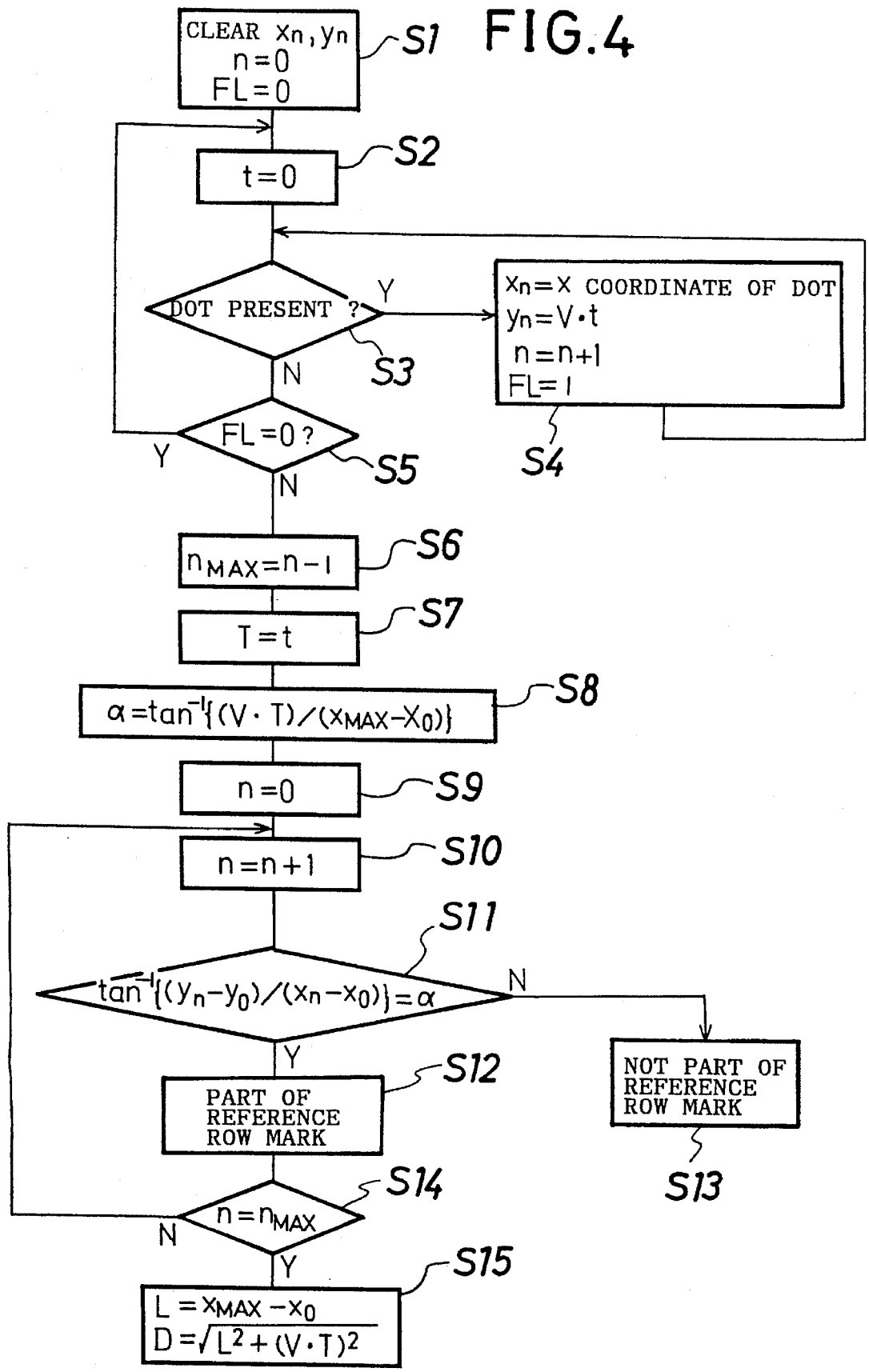
FIG. 4 is a flow chart illustrating processing of the mark sheet reading apparatus of FIG. 1 for detecting a reference row mark on a mark sheet and calculating the substantial length of the reference row mark and the length of the x-axis component of the reference row mark.

Referring to FIG. 4, $x_n$ and $y_n$ are first cleared and n and FL are set to n=0 and FL=0, respectively, as initialization at step S1. Then at step S2, the timer 20 is cleared so that t is set to t=0, and then at step S3, it is discriminated whether or not there is a dot or mark. When a dot is present, the control sequence advances to step S4, at which the x-axis coordinate of the dot is substituted into $x_n$, and the product V·t of the transporting speed V of the transporting mechanism 17 and the count value t of the timer 20 is substituted into the variable $y_n$ of the y-axis coordinate. Further, n is incremented to n+1 and FL is changed to FL=1 to set the dot detection flag. Thereafter, the control sequence returns to step S3 so that the same operation is repeated after the coordinates which make an object for detection of a dot of the reference row mark 14 are shifted at step S3.

If it is determined at step S3 that there is no dot, then it is discriminated subsequently at step S5 whether or not the flag FL is equal to 0, and if FL=0, then the control sequence returns to step S2. On the contrary if the flag FL is not equal to 0, then the control sequence advances to step S6, at which n−1 is substituted into $n_{MAX}$, and then to step S7, at which the current count value t of the timer 20 is substituted into the detection time difference T. Thereafter, at step S8, the angle α is determined in accordance with the following equation (6):

$$\alpha = \tan^{-1}\{V \cdot T/(x_{MAX} - x_0)\} \qquad (6)$$

where $x_0$ is the x-axis coordinate value of the dot detected first at steps S3 and S4 described above, and $x_{MAX}$ is the x-axis coordinate value of the dot detected last.

Then at steps S9 through S14, a successive condition of dots is confirmed to detect that they belong to the reference row mark 14. In particular, first at step S9, n is set to n=0 again, and then at step S10, n is incremented by one, whereafter the control sequence advances to step S11. At step S11, where the x-axis coordinate value and the y-axis coordinate value of the nth dot are presented by $X_n$ and $y_n$, respectively, and the x-axis coordinate value and the y-axis coordinate value of the first dot are represented by $X_0$ and $y_0$, respectively, it is discriminated whether or not the following equation (7) is satisfied:

$$\tan^{-1}\{(y_n-y_0)/(x_n-x_0)\}=\alpha \tag{7}$$

If this equation (7) is satisfied, then the control sequence advances to step S12, at which it is determined that the nth dot makes part of the reference row mark 14, but on the contrary if the equation (7) is not satisfied, then the control sequence advances to step S13, at which it is determined that the nth dot does not make part of the reference row mark 14. When it is determined at step S12 that the nth dot makes part of the reference row mark 14, it is determined at next step S14 whether or not $n=n_{MAX}$. If n is not equal to $n_{MAX}$, then the control sequence returns to step S10 so that the same processing as described above is thereafter repeated with n incremented by one at step S10. If it is determined at step S14 that $n=n_{MAX}$, since this signifies that the reference row mark 14 is detected finally, the control sequence advances to step S15, at which $X_{MAX}-X_0$ is substituted into the length L of the x-axis component of the reference row mark 14 and the substantial length D of the reference row mark 14 is calculated in accordance with the equation (1) given hereinabove.

After the substantial length D and the length L of the x-axis component of the reference row mark 14 are calculated in this manner, the mark sheet reading apparatus of FIG. 1 detects a timing mark 13 and a marked marking area 11 to detect the coordinates of the marked marking area 11. The detection processing of the mark sheet reading apparatus will be described below with reference to the flow chart of FIG. 5. It is to be noted that, in the flow chart shown in FIG. 5, the mark sheet reading apparatus operates on the assumption that the mark sheet 10 is in skew with a right portion thereof displaced upwardly as shown in FIG. 2.

Figure 5:
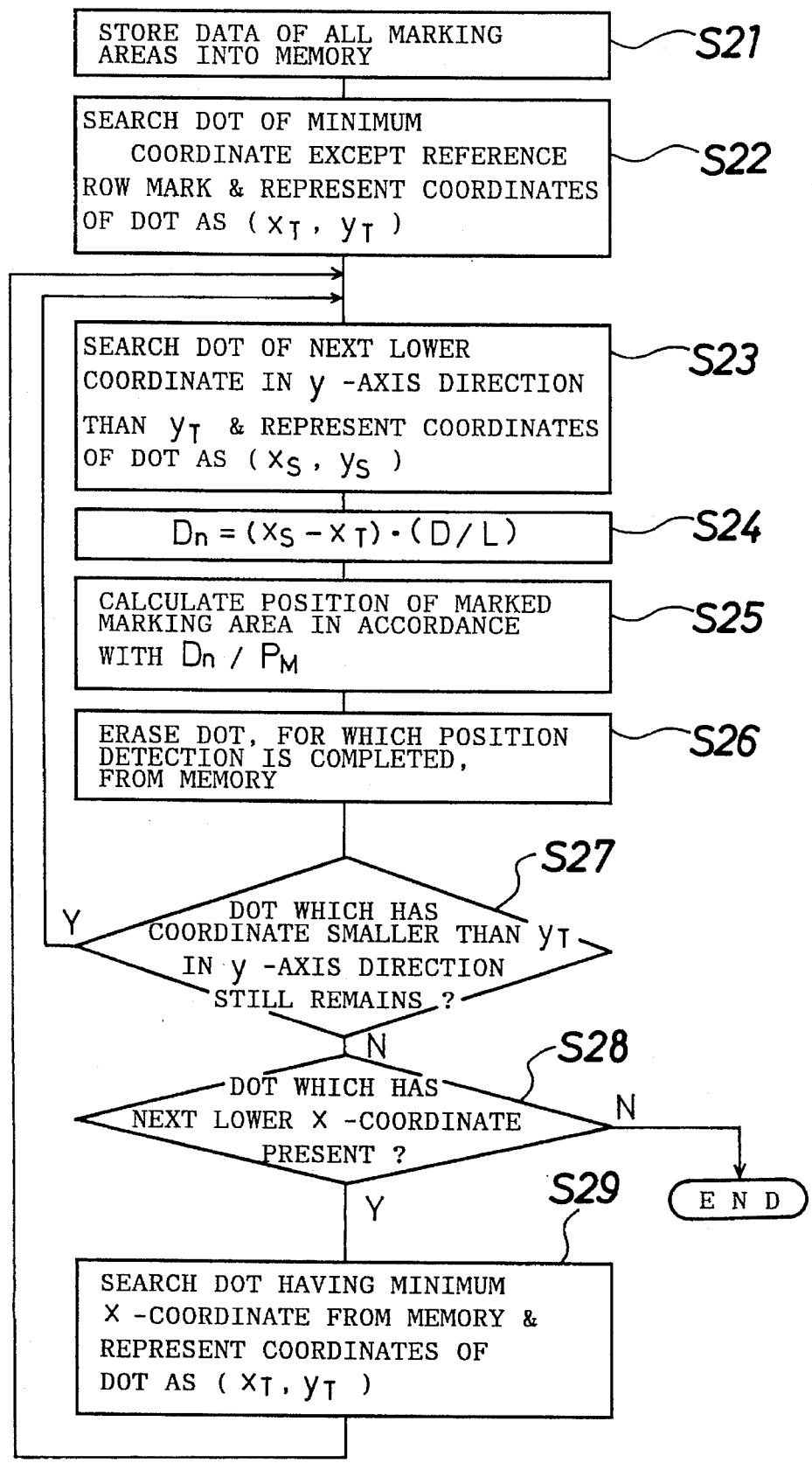
FIG. 5 is a flow chart illustrating coordinate correction processing executed by the mark sheet reading apparatus of FIG. 1 after completion of the processing illustrated in FIG. 4.

Referring to FIG. 5, read data from all of the marking areas on the mark sheet 10 are first stored into the memory 18 at step S21, and then at next step S22, a dot having a minimum coordinate value in the x-axis direction among all of the dots except the dots of the reference row mark 14, which has been detected already by way of the processing described hereinabove with reference to FIG. 4, is searched out from the memory 18. In this instance, the dot is a timing mark 13 on the first row. The coordinates of the dot are represented by $(X_T, y_T)$. Further at step S23, another dot having a coordinate value lower than and nearest to that of $y_T$ in the y-axis direction is searched out from the memory 18. In this instance, the dot is a marked marking area 11, and the coordinates of the dot are represented by $(X_S, y_S)$. Thereafter, at step S14, the distance $D_n$ between the two dots is calculated in accordance with the following equation (8):

$$D_n=(X_S-X_T)\cdot(D/L) \tag{8}$$

Then at step S25, the position of the marked marking area 11 is calculated from the ratio $D_n/P_M$ between the distance $D_n$ thus calculated and a predetermined pitch $P_M$ of the marking areas (distance between adjacent making areas on a same row). The dot from the marked marking area 11 for which calculation of the position is completed is erased from the memory 18 at next step S26.

At next step S27, it is discriminated whether or not there remains another dot having a coordinate smaller than $y_T$ in the y-axis direction, and if such dot is detected, then the control sequence returns to step S23 to similarly calculate the position of another marked marking area 11 on the same row. On the contrary, if no such dot is detected at step S27, then since this signifies that the processing for the first row is completed, the control sequence advances to step S28, at which it is detected whether or not there is another dot having a second lower coordinate value in the x-axis direction. If such dot is detected, then the control sequence advances to step S29, at which a dot having a minimum x-axis coordinate is searched out from among the dots having the second lower coordinate value from the memory 18, and the coordinates of the dot are represented as $(X_T, y_T)$. The dot in the present case is a timing mark 13 on the second row. Thereafter, the control sequence returns to step S23 to calculate the position of a marked marking area 11 on the second row in a similar manner as described above. By repeating such sequence of operations, the positions of the marked marking areas 11 on the individual rows are calculated one by one. When it is determined at step S28 that there remains no dot having a next lower coordinate value in the x-axis direction, since this means that there remains no timing mark 13, the processing is completed.

Figure 6:
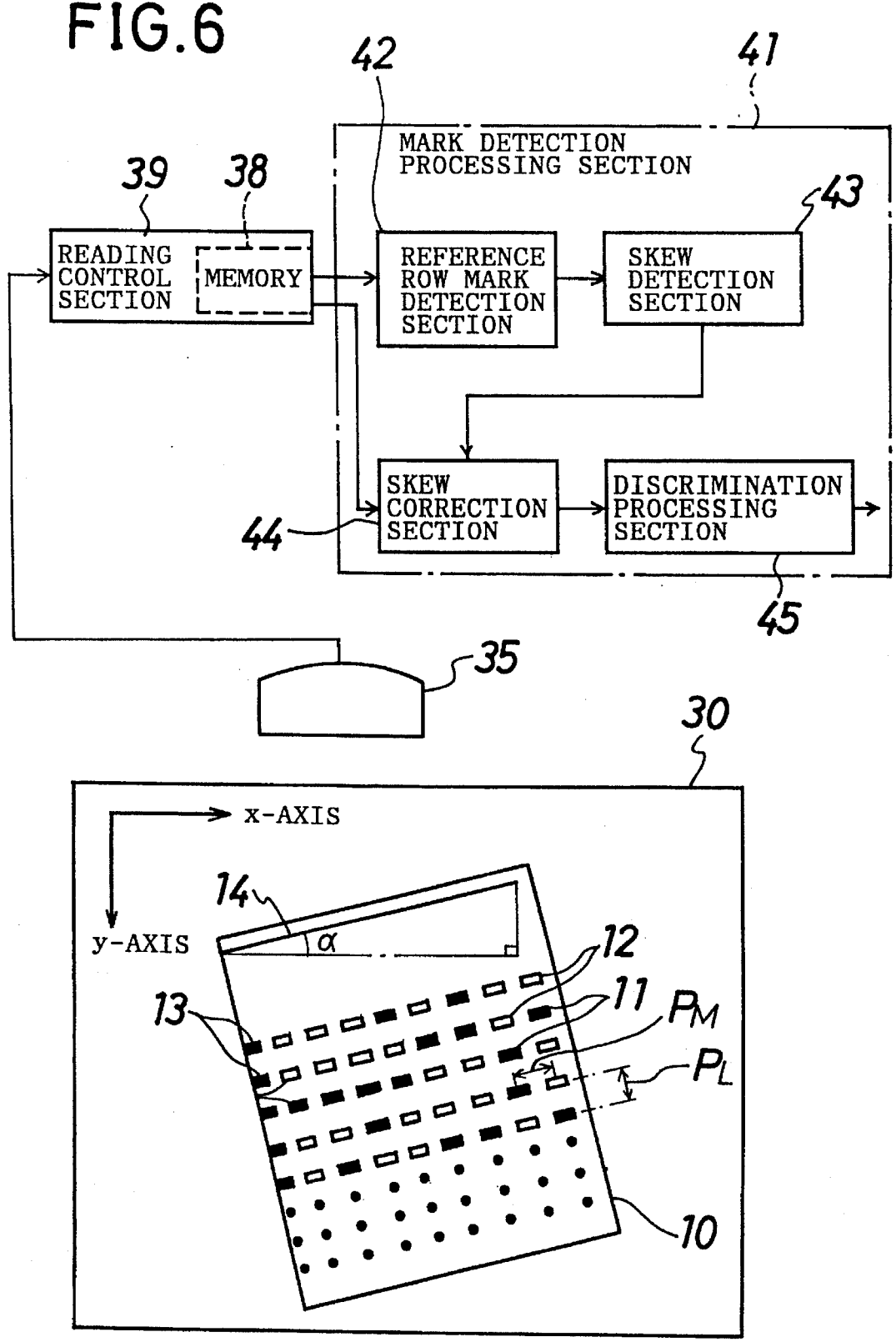
FIG. 6 is a block diagram of another mark sheet reading apparatus showing a second preferred embodiment of the present invention together with a mark sheet.
Figure 7:
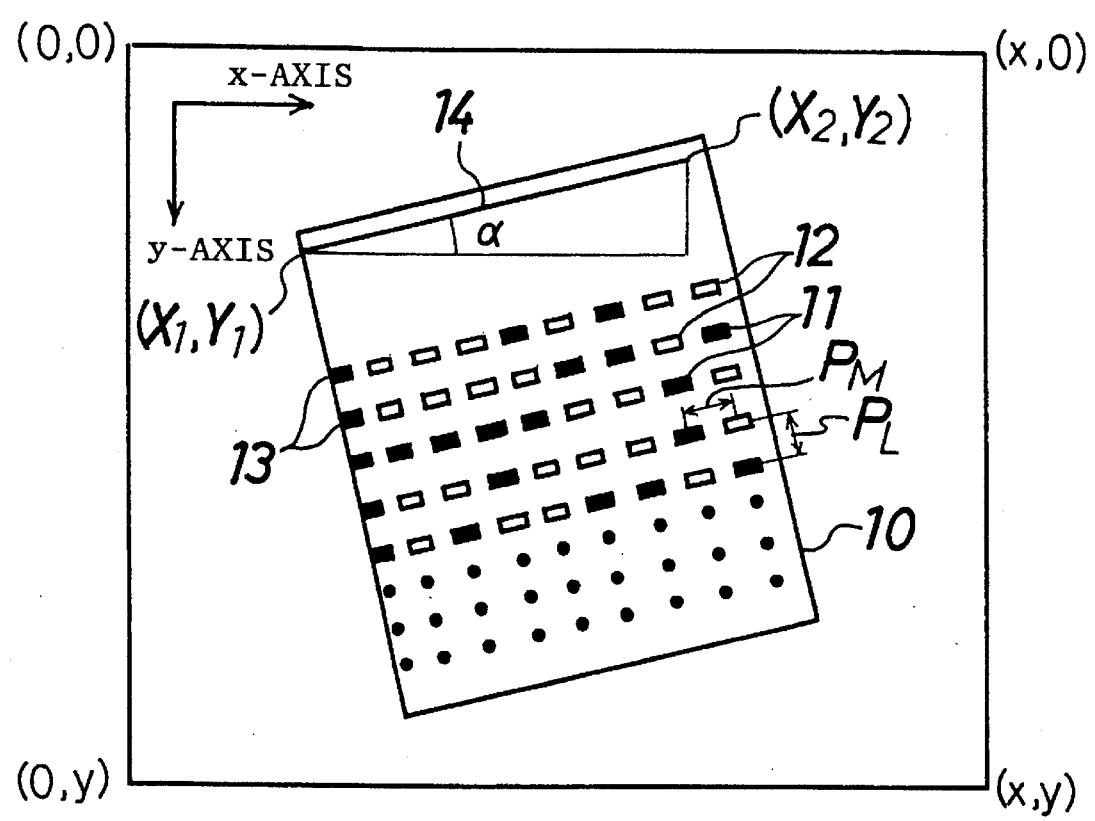
FIG. 7 is a diagrammatic view illustrating a storage condition of a memory of the mark sheet reading apparatus of FIG. 6.

Referring now to FIG. 6, there is shown a mark sheet reading apparatus according to a second preferred embodiment of the present invention. The mark sheet reading apparatus shown includes an image sensor 35 of the matrix type for imaging a mark sheet 10 at a time over an imaging range 30 which covers the entire area of the mark sheet 10, a reading control section 39 for controlling the reading operation of the image sensor 35 and storing two-dimensional data read from the imaging range 30 into a memory 38, and a mark detection processing section 41 for detecting and discriminating marks or marked marking areas from among the two-dimensional data stored in the memory 38. In FIG. 7, the stored condition of the read data in the memory 38 is schematically shown. It is to be noted that a transporting mechanism for transporting the mark sheet 10 is omitted in FIG. 6.

The mark detection processing section 41 includes a reference row mark detection section 42 for detecting the reference row mark 14 from among data stored in the memory 38, a skew detection section 43 for calculating an inclination rate of the reference row mark 14 detected by the reference row mark detection section 42, a skew correction section 44 for correcting the coordinates of the marked marking areas 11 in accordance with the inclination rate of the reference row mark 14 detected by the skew detection section 43, and a discrimination processing section 45 for performing predetermined discrimination processing and so forth for the thus corrected coordinates.

Thus, the mark sheet reading apparatus of FIG. 6 first detects the reference row mark 14 from among two-dimensional data stored in the memory 38, and calculates the length L of the x-axis component of the reference row mark 14 from the x-axis coordinates of the opposite ends of the reference row mark 14 and calculates the substantial distance D of the reference row mark 14 from the x-axis coordinates and the y-axis coordinates of the opposite ends of the reference row mark 14. The processing of the mark sheet reading apparatus just described will be described in more detail below with reference to the flow chart of FIG. 8. Here, the variable representing the value of the x-axis coordinate of a particular one point is represented by X and the variable representing the y-axis coordinate of the particular one point is represented by Y; the variable representing the number of dots of the data is represented by n; the maximum value of the number of dots is represented by $n_{MAX}$; and the variable representing the x-axis coordinate of a particular one dot is represented by $x_n$ and the variable representing the y-axis coordinate of the particular one dot is represented by $y_n$.

Figure 8:
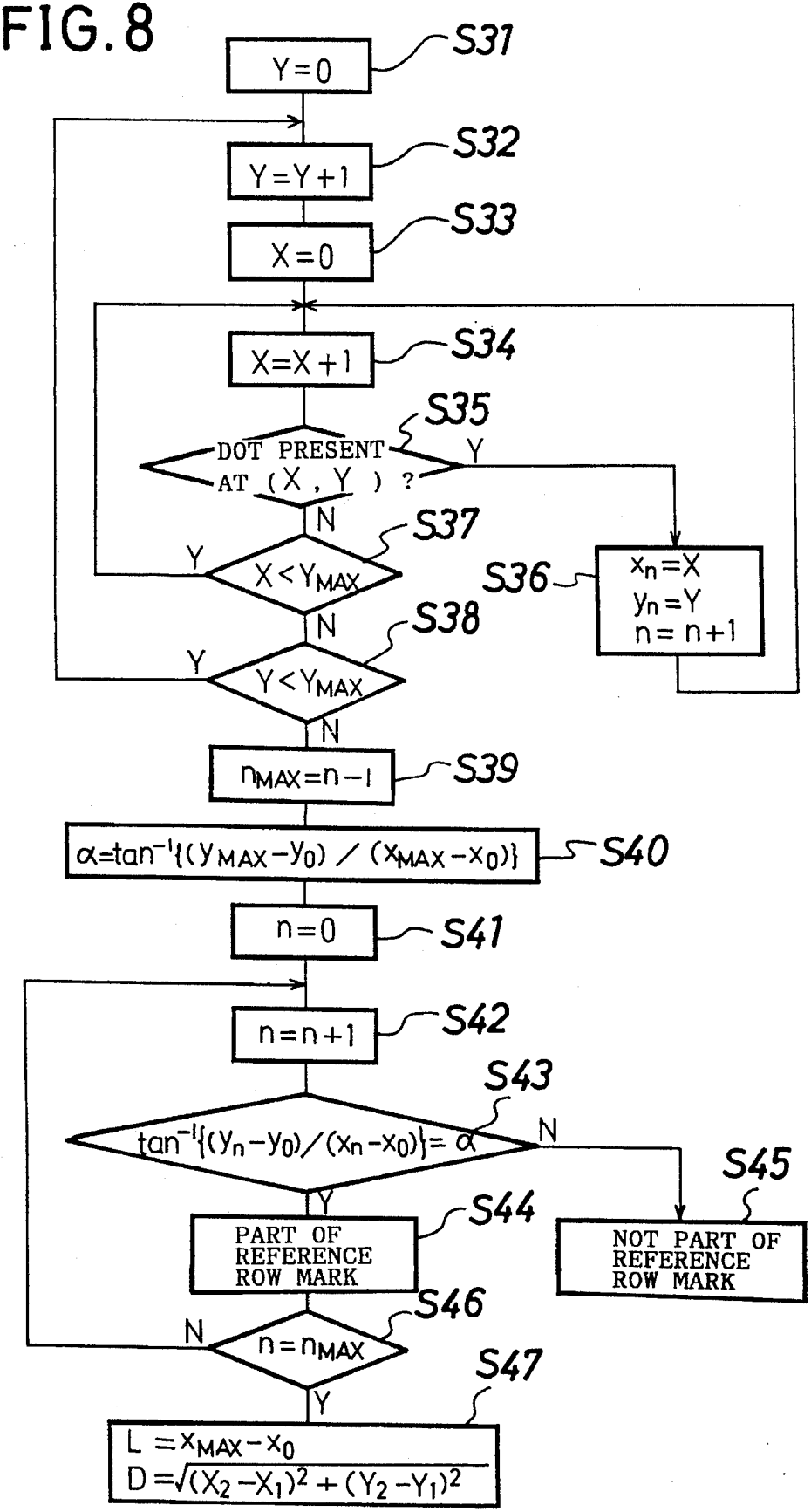
FIG. 8 is a flow chart illustrating processing of the mark sheet reading apparatus of FIG. 6 for detecting a reference row mark on a mark sheet and calculating the substantial length of the reference row mark and the length of the x-axis component of the reference row mark.

Referring to FIG. 8, Y is first cleared to Y=0 at step S31, and then at step S32, the y-axis coordinate value Y is incremented by one to Y+1, whereafter X is cleared to X=0 at step S33 and then the x-axis coordinate value X is incremented to X+1 at step S34. Then at step S35, it is discriminated whether or not there is a dot at the point (X, Y) indicated by the thus incremented x-axis coordinate value and y-axis coordinate value. If a dot is present, then the control sequence advances to step S36, at which the x-axis coordinate value X then is substituted into $x_n$ and the y-axis coordinate value Y then is substituted into $y_n$ and then n is incremented to n+1 to shift the object for coordinate detection in the x-axis direction. Thereafter, the control sequence returns to step S34 to repeat the processing at steps S34, S35 and S36 described above.

On the contrary, when it is determined at step S35 that there is no dot, the control sequence advances to step S37, at which it is discriminated whether or not the x-axis coordinate value X is lower than the maximum value $X_{MAX}$. If the x-axis coordinate value X is lower than the maximum value $X_{MAX}$, then the control sequence returns to step S34 to repeat the processing at steps S34, S35, S36 and S37 described above. If it is determined at step S37 that the x-axis coordinate value X reaches the maximum value $X_{MAX}$, then the control sequence now advances to step S38, at which it is determined whether or not the y-axis coordinate value Y is lower than the maximum value $Y_{MAX}$. If the y-axis coordinate value Y is lower than the maximum value $Y_{MAX}$, then the control sequence returns to steps S32 to repeat the processing at steps S32 through S38 described above.

If it is determined at step S38 that the y-axis coordinate value Y reaches the maximum value $Y_{MAX}$, since this signifies that detection of dots of the marked marking areas 11 of the mark sheet 10 is completed for both of the y-axis direction and the y-axis direction, the control sequence advances to step S39, at which $n_{MAX}$ is decremented by one to n-1, and then to step S40, at which the angle α is determined in accordance with the following equation (9):

$$\alpha = \tan^{-1}\{(y_{MAX}-y_0)/(x_{MAX}-x_0)\} \quad (9)$$

where $x_0$ is the x-axis coordinate value of the dot detected first at steps S35 and S36 described above, and $X_{MAX}$ is the x-axis coordinate value of the dot detected last.

Then at steps S41 through S46, a successive condition of the dots is confirmed to detect that they belong to the reference row mark 14. The processing at steps S41 through S46 is the same as that at steps S9 through S14 described hereinabove with reference to FIG. 4, and overlapping description of the same is omitted herein to avoid redundancy.

After the reference row mark 14 is detected finally as a result of the processing at steps S41 through S46, the control sequence advances to step S47, at which $X_{MAX}-X_0$ is substituted into the length L of the x-axis component of the reference row mark 14 and the substantial length D of the reference row mark 14 is calculated in accordance with the equation (2) given hereinabove.

Thereafter, also the mark sheet reading apparatus of the present second embodiment performs such processing as illustrated in FIG. 5 similarly as in the first embodiment to detect the timing marks 13 and the marked marking areas 11 to detect the coordinates of the marked marking areas 11.

Having now fully described the invention, it will be apparent to one of ordinary skill in the art that many changes and modifications can be made thereto without departing from the spirit and scope of the invention as set forth herein.

What is claimed is:

1. A mark sheet reading apparatus for reading a mark sheet, comprising:

a transporting apparatus for transporting a mark sheet, which has a plurality of marking areas arranged in a matrix of rows and columns thereon, in a direction along a column of the matrix;

the marking areas of the mark sheet being selectively marked or left unmarked so as to represent binary data, the marks in the marking areas including timing marks arranged in a column corresponding to the individual rows of the matrix;

an image sensor for reading the mark sheet;

the mark sheet further having a reference row mark in the form of a continuous straight line provided in parallel to the rows of the matrix and extending over a length covering the overall length of the rows; and a mark detection processing section for detecting and discriminating a binary mark from within data read by said image sensor;

said mark detection processing section including reference row mark detection means for discriminating a continuous straight line from among the data read by said image sensor to detect the reference row mark of the mark sheet, skew detection means for detecting an inclination rate of the reference row mark detected by said reference row mark detection means, and skew correction means for correcting coordinates of binary data read by said image sensor in accordance with the inclination rate of the reference row mark detected by said skew detection means;

wherein said skew detection means includes, where a direction in which said image sensor scans the mark sheet is represented as x-axis direction and another direction in which the mark sheet is transported by said transporting apparatus is represented as y-axis direction, means for calculating a length L of an x-axis component of the reference row mark detected by said reference row mark detection means, means for detecting a difference T in detection time between the opposite ends of the reference row mark in the y-axis direction, and means for calculating a substantial length D of the reference row mark from the difference T in detection time, a transporting speed V of said transporting apparatus and the length L of the x-axis component of the reference row mark, and said skew correction means corrects the coordinate values of the binary data in accordance with a ratio between the substantial length D and the length L of the x-axis component of the reference row mark.

2. A mark sheet reading apparatus for reading a mark sheet, comprising:

a transporting apparatus for transporting a mark sheet, which has a plurality of marking areas arranged in a matrix of rows and columns thereon, in a direction along a column of the matrix;

the marking areas of the mark sheet being selectively marked or left unmarked so as to represent binary data, the marks in the marking areas including timing marks arranged in a column corresponding to the individual rows of the matrix:

an image sensor for reading the mark sheet;

the mark sheet further having a reference row mark in the form of a continuous straight line provided in parallel to the rows of the matrix and extending over a length covering the overall length of the rows;

a mark detection processing section for detecting and discriminating a binary mark from within data read by said image sensor;

said mark detection processing section including reference row mark detection means for discriminating a continuous straight line from among the data read by said image sensor to detect the reference row mark of the mark sheet, skew detection means for detecting an inclination rate of the reference row mark detected by said reference row mark detection means, and skew correction means for correcting coordinates of binary data read by said image sensor in accordance with the inclination rate of the reference row mark detected by said skew detection means;

a memory for storing data read by said image sensor as two-dimensional data, and wherein said skew detection means calculates, where a direction in which said image sensor scans the mark sheet is represented as x-axis direction and another direction in which the mark sheet is transported by said transporting apparatus is represented as y-axis direction, a length L of an x-axis component and a substantial length D of the reference row mark from the coordinates in the x- and y-axis directions of the two-dimensional data stored in said memory, and said skew correction means corrects the coordinates of the binary data in accordance with a ratio between the length L of the x-axis component and the substantial length D of the reference row mark.

* * * * *